_United States Patent_ [19]

Hurst et al.

[11] 4,121,945

[45] Oct. 24, 1978

[54] FLY ASH BENIFICIATION PROCESS

[75] Inventors: Vernon J. Hurst, Athens; Robert W. Styron, Atlanta, both of Ga.

[73] Assignee: Amax Resource Recovery Systems, Inc., Atlanta, Ga.

[21] Appl. No.: 677,511

[22] Filed: Apr. 16, 1976

[51] Int. Cl.² .............................................. C04B 31/10
[52] U.S. Cl. ......................... 106/288 B; 106/DIG. 1; 209/10; 209/39; 241/24
[58] Field of Search ..................... 209/2, 3, 4, 12, 166, 209/214, 10, 39, 40; 241/24, 81; 106/288 B, DIG. 1

[56] References Cited

U.S. PATENT DOCUMENTS

| | | | |
|---|---|---|---|
| 1,984,386 | 12/1931 | Tschudy | 209/164 |
| 2,987,406 | 6/1961 | Minnich | 106/97 |
| 3,565,648 | 2/1971 | Mori | 106/DIG. 1 |
| 3,606,176 | 9/1971 | Vodic | 241/24 |
| 3,725,538 | 4/1973 | Brewer | 209/12 X |
| 3,769,054 | 10/1973 | Pennachetti | 106/DIG. 1 |
| 3,770,213 | 11/1973 | Lynn | 269/166 X |
| 3,794,250 | 2/1974 | Brewer | 241/24 X |
| 3,830,776 | 8/1974 | Carlson | 260/37 EP |
| 3,852,084 | 12/1974 | Webster | 106/DIG. 1 |

FOREIGN PATENT DOCUMENTS 1,471,360  4/1969  Fed. Rep. of Germany .... 106/DIG. 1

OTHER PUBLICATIONS

The Use of Pulverized Fuel Ash in the Mfr. of Cement in Hungary, Kovach, 106 DIG. 1, pp. H2, Mar. 1975, Chem. Absts., 79, 1973, 44213g.

_Primary Examiner_—Robert Halper
_Attorney, Agent, or Firm_—Biebel, French & Nauman

[57] ABSTRACT

A wet process is disclosed for the beneficiation of electrostatic fly ash to provide therefrom a series of products which have higher commercial value than the raw fly ash, including a carbon concentrate, cenospheres, an iron concentrate, an enhanced pozzolan, and an inert mineral filler.

11 Claims, 2 Drawing Figures

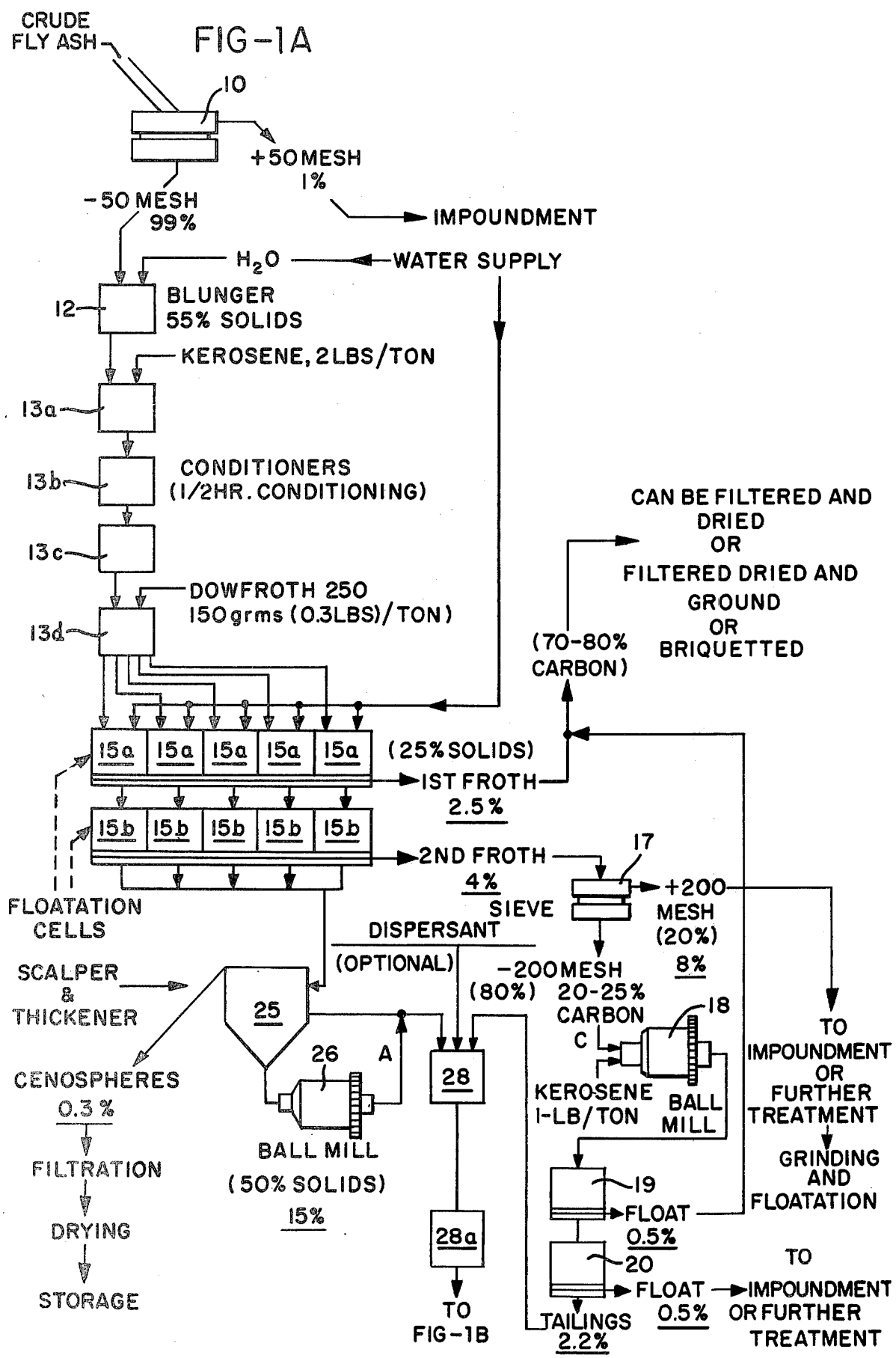

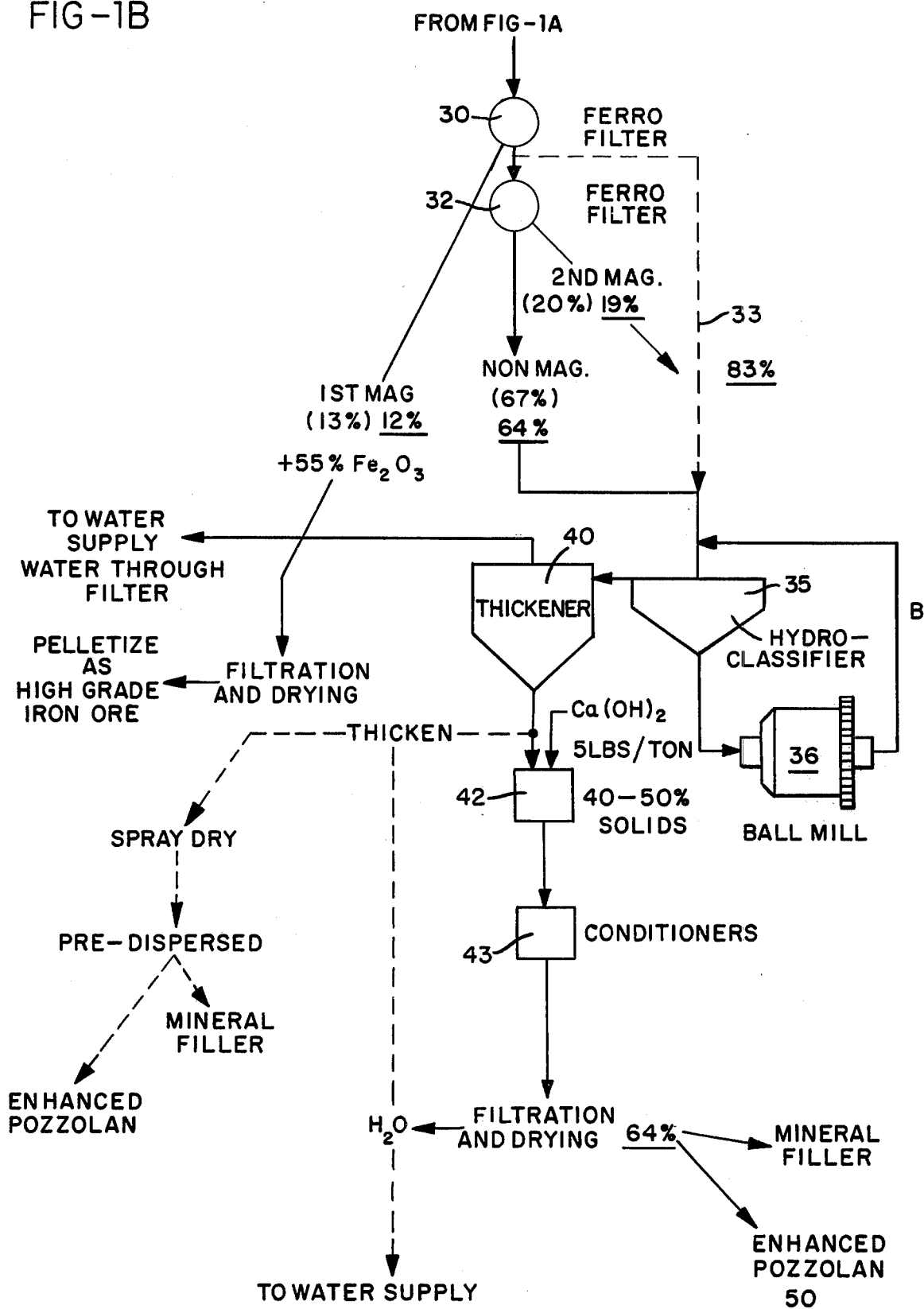

FLY ASH BENIFICIATION PROCESS

BACKGROUND OF THE INVENTION

This invention relates to processes and products derived from fly ash. Fly ash is the by-product of burning pulverized coal, and its chemical content, and the size distribution of its particles, vary widely in accordance with the source of the coal, the fineness to which it is ground, and the furnace within which it is burned. The chemical compositions of fly ash can vary widely, as follows:

| Component | Per cent by Weight |
|---|---|
| $SiO_2$ | 35–55 |
| $Al_2O_3$ | 15–35 |
| FeO | |
| $Fe_2O_3$ | 3–25 |
| CaO | 3–8 |
| MgO | 0.5–3 |
| $TiO_2$ | 1–3 |
| $Na_2O$ | |
| $K_2O$ | 1–6 |
| $SO_3$ | 1–3 |
| C | 0.5–10 |
| $H_2O$ | 0.5–0.7 |

These compositional ranges apply to most fly ashes derived from coal, and the composition of the fly ash from a given plant is usually fairly constant with a given source or grade of coal.

Most previous efforts to extract useful components from fly ash have dealt with it in bulk. It has been subjected to various routine ore dressing techniques. With additives it has been reheated and reacted, compressed and fired, pelletized and sintered, fluxed and melted. Various chemical extractions have been tried.

In U.S. Pat. of Pennachetti et al, No. 3,533,819 issued Oct. 13, 1970, certain processes were applied to fly ash in an attempt to provide useful fractions therefrom. The fly ash was handled in its dry state and was air classified to separate the finer fraction from the coarser fraction, and the finer fraction was then used as a pozzolan to replace Portland cement. Magnetic separation was applied to remove a magnetic fraction and to form an iron concentrate product and the coarse fraction was screened to obtain a coarse carbon product. However, in the Pennachetti et al patent, a major portion, if not all, of the original carbon content by percentage was allowed to remain in the pozzolan material, and nothing further was done to the pozzolan material to improve or enhance it.

Magnetic separation of whole fly ash is also known from U.S. Pat. No. 2,987,408 of Minnick, issued June 6, 1961, to provide a non-magnetic fly ash fraction for use as a pozzolan.

The dry ball milling of whole fly ash and lime mixtures to provide an improved pozzolan which is then diluted with additional fly ash prior to use is disclosed in U.S. Pat. of Webster, No. 3,852,084, issued Dec. 3, 1974. In Webster, it is noted that the glassy spheres of the fly ash may be fractured in the ball milling. The fly ash is milled with a relatively large amount of lime, that is from 4 to 90 percent by weight of the premix and from 1 to 40 percent by weight of the final diluted mixture. There is no suggestion in Webster of substantially eliminating the carbon or the iron content fly ash prior to milling, nor is wet processing suggested, nor is any mixture suggested in which the lime component is about one percent or less of the fly ash by weight.

SUMMARY OF THE INVENTION

We have examined fly ash from a somewhat different point of view. Specifically, we have examined fly ash on the basis of examining the individual fly ash particles to learn more of their nature and the components which make up the particles. Fly ash particles are fine, gray to black in color, but occasionally white or brownish in color. They vary from each other in size, shape, mineralogy, chemical composition, surface characteristics and internal structure. Their detailed characteristics partly are inherited from the petrographic characteristics of the parent coal, mainly its incombustible or incompletely combustible constituents, but partly are derived from the manner in which the coal was processed and fired.

Major incombustible constituents include clay minerals, quartz, mica, carbonates and accessory detrital minerals although the mineralogy may vary with the type or source of coal used. Incompletely combustible constituents are pyrite-marcasite.

The incombustibles may be finely disseminated through the coal and are inherent in seams within the coal; they compose the rock layers which enclose the coal. Thus, the manner of mining and any processing at the mine site, such as washing, can significantly modify the kind and proportion of incombustibles associated with a given coal. At the steam plant, the pulverizing equipment, the make and type of boiler, the rate of burning, air-fuel ratio and the type of collectors that are used also strongly influence the type of fly ash which the plant yields. Generally, the finer the coal is pulverized before burning, the finer will be the fly ash. For a given fineness of coal, the fly ash tends to be finer and includes less unburned carbon when the air/fuel ratio is high.

The average size of fly ash particles varies widely, from about 80 microns or more top size to less than 1 micron. Commonly the particles are hollow and vesicular, particularly the coarse particles. The proportion of spheres increases with decreasing size.

The shape of the particles also vary with size. Coarser particles are frequently scoriaceous, but the main particle shape is the sphere with an exterior surface which is relatively smooth. The proportion of spheres increase with decreasing particle size so that the particles finer than 250 mesh (62 microns) are predominantly spheres.

The chemical composition of the individual fly ash particles ranges widely, which is expected considering that the fly ash particles represent a variety of fine-grained minerals which were once scattered throughout the coal. The iron content of the highly magnetic grains varies from 60 to 80 percent iron oxide expressed as $Fe_2O_3$. According to the X-ray diffraction pattern, most of this iron is actually magnetite, $Fe_3O_4$, rather than $Fe_2O_3$. Magnetite, then, commonly accounts for 50 to 85 percent of the highly magnetic grains. The remainer is an iron silicate or aluminous iron silicate glass.

Particles with a moderate to low magnetic susceptibility commonly run 20 to 30 percent alumina, 40 to 50 percent silica, and less than 10 percent iron oxide.

A small proportion of the fly ash particles analyze only a fraction of a percent alumina plus silica and iron. They are highly vesicular from the emission of gases during combustion. They are black, and are characterized by high reflectance when polished. They are incompletely burned coal. Due to their high vesicularity, most of them float on water, when freed from other particles.

Petrographic examination of many polished thin sections, prepared from epoxy mounts of different size fractions of fly ash particles, shows that the major mineralogical constituent is glass, generally more than 85 percent. Typical crystalline phases commonly present, as revealed by X-ray diffractograms, are:

| | |
|---|---|
| Mullite, $3Al_2O_3$ | (nearly all samples) |
| Quartz, $SiO_2$ | (nearly all samples) |
| Magnetite, $Fe_3O_4$ | (nearly all samples) |
| Fired clay | (commonly) |
| Hematite, $Fe_2O_3$ | (occasionally) |
| Anhydrite, $CaSO_4$ | (occasionally) |
| Illite | (rarely) |

Plus: Traces of unidentified phases.

The only crystalline phase commonly coarse enough to be seen readily by optical examination is quartz, which remains unfused or only partially fused during combustion of coal. The mullite is not a relict phase. It forms during combustion of the coal, but does not remain hot long enough for it to develop crystallites of a sufficient size to be seen optically, or does so only rarely.

The magnetite likewise develops during the combustion period, derived mainly from pyrite or marcasite, $FeS_2$, scattered throughout the coal. During combustion, the sulphur burns leaving a fused, iron-rich residue which partly crystallizes as magnetite.

We have discovered that subjecting fly ash up to about twenty-four hours of wet processing does not adversely affect its pozzolanity. However, it does appear that substantially longer periods of wet processing running well in excess of 48 hours may adversely affect fly ash as a pozzolan. This discovery permits the use of standard commercial wet processing techniques to provide improved separation.

A further discovery which we have made is that the pozzolanity of fly ash can be improved to a surprising extent when substantially all of the carbon content of the fly ash is eliminated. The carbon portion of the fly ash is relatively soft in nature and has little strength. It does not bond readily with cement, and in fact acts as a lubricant between aggregate particles. Also, in the dry state, carbon is hydrophobic and is thus difficult to wet. Also, the carbon has a lower specific gravity than the bulk of the fly ash and weighs approximately one-half of the major silica constituents and therefore occupies a volume which can be replaced with pozzolanic particles. Also, carbon smears over other particles and is believed to inhibit the ultimate indurating reactions. Tests have shown notable increases in strength of concrete when the carbon has been removed.

The process of the present invention also substantially removes the scoriaceous particles which are dark colored and ferruginous, though usually they are not the most iron-rich particles. In most fly ashes, their proportion decreased with decreasing particle size to improve the pozzolanic properties. They also occupy volume that could be replaced with pozzolanic glass spheres.

The hollow cenospheres are very thin walled with little strength. They crush easily and are large in size. They are solidified glasses whose viscosity, at the time they were fused, was intermediate; they either trapped gas while they were molten, or their present material generated gas. Some of the cenoshperes are dark from being composed of ferruginous glass, some of which either have fine adhering fine carbon or dissolved carbon. Removal of the cenospheres provides improved cube strength. The proportion of cenospheres always decreases with the decreasing particle size. The cenospheres occupy volume that should be replaced with pozzolanic glassy spheres. The cenospheres are removed from fly ash in both improved pozzolan and in an industrial extender, and are marketed separately.

All Fe-containing fly ash particles are magnetic to some degree. The most magnetic are the dark particles composed of crystalline magnetite. Ferruginous glasses show intermediate, magnetic susceptibility, and the particles which contain little or no iron such as quartz and some of the fired clays, are non-magnetic. The glasses containing only 2 to 10 percent $Fe_2O_3$ are non-magnetic with respect to a regular hand magnet, but still show appreciable magnetic susceptibility in a high intensity magnetic field. The term magnetic and non-magnetic becomes relative to the intensity of the induced magnetic field. While a high intensity magnetic separator would therefore remove most of the product being processed, we found that relatively lower intensity units which are commercially available will effectively remove the crystalline magnetite or the apparent magnetic portion of the fly ash.

The variation in iron content of individual fly ash particles is gradational, from the maximum down to 3 to 4 percent $Fe_2O_3$. However, with a variable electromagnetic field, and other suitable conditions, fly ash particles with any desired iron content from the maximum to the minimum can be separated. The iron rich particles are mostly in the coarser size fractions, and the removal of an iron-rich concentrate leaves a somewhat finer, lower iron material which, after carbon and cenosphere removal, produces an improved pozzolan. The iron-rich concentrate is replaced with glass spheres with high pozzolanic properties.

We have also discovered that the fine fly ash fraction can be further improved by grinding. Since the dominant particle shape of the finer fractions is spherical, it inherently has the lowest surface area-to-volume ratio of any solid. By breaking the spheres in grinding, this produces particles which are not only finer, but which are also irregular in shape and thus greatly increases the reactive surface for any given mass of particles. Our research and test results show that the enhanced pozzolan product of our process can replace up to 40 percent of the Portland cement in concrete mixes, which is approximately a 100 percent increase in Portland cement replacement over that of conventional fly ash pozzolan.

Further improvement may be had by adding a small amount of calcium hydroxide or other source of calcium ions. Since only the superficial layer of many of the grains is reactive, the chemical composition of the reacting particles can be made to approximate the composition of Portland cement by adding far less lime than would be required to adjust the total compositions of the pozzolan. Thus, the full benefits of the addition of lime are obtained by adding less lime than might first be expected, such as less than 1 percent by weight. The optimum amount of lime required depends upon the fineness of the particles and how thoroughly the lime is mixed. We have found that only 5 pounds of calcium hydroxide need be added to coat the individual particles of a ton of the enhanced pozzolan so that the reactive coated surfaces have the correct bulk composition for the chemical reactions. This provides an available source of lime in the enhanced pozzolan rather than waiting for Ca(OH)$_2$ to be liberated in the hydration of Portland cement.

One alternate product made by our process is that of an industrial extender or filler which has a wide variety of uses in industry. The primary characteristic of this filler is that of glass, and a dispersing agent may be added during the wet processing which provides a filler which readily disperses upon subsequent use.

The method also includes the removal of a concentrated carbon fraction containing up to 70 percent pure carbon which may be processed, dried or used as a carbon black or as a filler or reinforcing agent in rubber. The cenospheres are removed by overflow flotation and themselves have commercial value.

It is therefore an object of our invention to provide a low cost processing using commercially available equipment for the wet processing and resulting benefication of fly ash, to provide one or more useful products therefrom.

It is also an object of this invention to provide an enhanced pozzolan for use with concrete mixes or the like, and to provide a method for producing an enhanced pozzolan primarily from raw fly ash.

Another object of the invention is that of a process for producing a carbon black and an iron-rich concentrate from fly ash.

A further object is the provision of an industrial extender and the method of making the same from fly ash.

These and other objects and advantages of the invention will be apparent from the following description, the accompanying drawings and the appended claims.

BRIEF DESCRIPTION OF THE DRAWINGS

FIGS. 1A and 1B are flow diagrams of the process of this invention.

DETAILED DESCRIPTION OF PREFERRED EMBODIMENTS

In the description which follows, a wet processing flow diagram consisting of FIGS. 1A and 1B illustrate the applications of commercial wet processing techniques in the practice of our invention. Also shown on FIGS. 1A and 1B are percentages of flow through or removal by, the process for a given typical fly ash. The actual percentages will vary, of course, when different fly ashes are used. The underscored values represent techniques of the total input by weight. The fly ash which we have used herein to illustrate the application of our process is an electrostatically collected ash known as "Bowen" fly ash because it was taken from the Bowen Plant of Georgia Power Company in Stilesboro, Georgia. and has the following approximate analysis:

| Physical | Dry Screen | Wet Screen |
|---|---|---|
| + 50 mesh | 3.78 | 1.06 |
| −50 + 100 mesh | 8.53 | 1.77 |
| −100 + 250 mesh | 24.36 | 5.83 |
| −200 + 250 mesh | 11.84 | 2.97 |
| −250 mesh | 51.49 | 83.37 |

| Mesh Size | Al$_2$O$_3$ | SiO$_2$ | FeO | MgO | CaO | TiO$_2$ |
|---|---|---|---|---|---|---|
| | | | magnetic | | | |
| −50 + 100 | 21 | 26 | 44 | 2.1 | 5.2 | .5 |
| −100 + 200 | 8 | 21 | 70 | .5 | .3 | .5 |
| −200 + 250 | 14 | 23 | 60 | .8 | 2.3 | .6 |
| | | | non-magnetic | | | |
| −50 + 100 | 20 | 43 | 22 | 1.4 | 6.0 | .6 |
| −100 + 200 | 23 | 49 | 17 | 1.4 | 7.8 | .6 |
| −200 + 250 | 24 | 47 | 23 | 0.7 | 2.4 | .6 |
| Total composition adjusted for size distribution and magnetic/non-magnetic ratio | 19 | 37 | 36.7* | 0.9 | 3.4 | 0.5 |
| Chemical composition of two bulk samples | 29.4 | 51.7 | 7.3* | .05 | | |
| | 26.0 | 46.7 | 20.9* | .6 | .9 | .96 |

*Expressed as Fe$_2$O$_3$

NOTE:
The upper data are averages of electron microprobe analyses of 6-10 grains of each fraction. The two chemical compositions of the bulk sample were obtained by regular chemical methods on two different Bowen fly ash samples. Apparently the probe operation tended to selected the more massive grains for analysis (those higher in iron and lower in alumina and silica).

Referring first to FIG. 1A, electrostatic fly ash is applied, either wet or dry, to a sieve 10 in which the material exceeding 50 mesh is scalped off for impoundment. By removing the 50+ mesh material, the larger pieces of carbon and other agglomerated particles are removed. The material which passes the 50 mesh screen is applied to a blunger 12 in which water is added to provide a consistency of about 55 percent solids or higher. The material is now passed through a series of conditioners or mixing tanks 13a through 13d. The tanks 13 are essentially conditioning and holding tanks. Kerosene at the rate of two pounds per ton of fly ash is added to the slurry in conditioner 13a. This conditions the surface of the carbon particles in the fly ash and allows interaction with the air bubbles for subsequent froth flotation. The fly ash slurry with the kerosene is conditioned for at least ½ hour of total in the series-connected conditioners 13a to 13d. We have found that recovery of carbon can be improved by the addition of a small amount of frothing agent in the final conditioning tank 13d, and for this purpose, polypropylene glycol methyl esters sold under the trademark DOWFROTH 250 by The Dow Chemical Company, Walnut Creek, California 94598, is effective as a frothing agent. This agent may be added at the rate of 150 grams per ton of fly ash input.

The conditioned material which now contains kerosene and the particle frothing agent is fed off to a series of parallel-connected flotation cells 15a and the carbon is floated off the top using the froth flotation technique. The flotation cells 15a are banked in parallel, depending on the total size and tonnage required, and employ air bubbles to separate the carbon material. Dilution water is added to the flotation cells 15a to bring the solids content down to 25 percent. The particles which are coated thus become attached to the air bubbles which rise to the surface. Suitable flotation cell equipment is made by Denver Equipment Division, P. O. Box 5268, Denver, Colorado, under the tradename D-R DENVER FLOTATION.

The first froth or overflow comes out from 75 to 80 percent carbon and may consist of about 2.5 percent of the total input. This product can be utilized directly as a carbon black and can be dried or filtered, ground and briquetted to produce a commercial product.

Further, carbon removal is effected by a second series or bank of flotation cells 15b which are connected in series with the cells 15a. A second froth is removed which may comprise about 4 percent to the total input. The output of the second froth may be discarded or may be further processed. As frothing of the sample continues, the carbon concentrate becomes finer grained and lower in carbon. These relations are illustrated by analyzing the carbon concentrate obtained from Bowen fly ash by frothing until all carbon is removed. Sieving and splitting each size fraction into a magnetic and non-magnetic portion (with a hand magnet) yield the following distribution of carbon:

| Size Fraction | | Per cent Carbon |
|---|---|---|
| +30 mesh | | 74.6 |
| −30 + 100 mesh - | magnetic | 45.5 |
| | non-magnetic | 62.0 |
| −100 + 200 mesh - | magnetic | 46.1 |
| | non-magnetic | 61.6 |
| −200 mesh | | 24.6 |

The addition of sodium hexametaphosphate, a dispersant, during preflotation conditioning, gives a cleaner carbon separation. Some common dispersants, however, adversely affect carbon separation. "Orzan S", for example, cannot be used because it is not only a dispersant but is also a carbon depressant.

The carbon that is removable from fly ash is mostly vesicular. It crushes readily. When ground to submicron size particles, it can be used as a filler and reinforcing agent in rubber.

The purpose of the cells 15b is to effect a substantial removal of the initial carbon content of the fly ash to produce an end item; either an enhanced pozzolan or an industrial extender, which is substantially free of carbon, that is, it contains less than 1 percent carbon by weight.

By applying the output to a 200 mesh sieve 17, about 20 percent of the input is removed as 20–25 percent pure carbon. The minus 200 mesh material from the second froth which passes through the sieve 17 may be further conditioned with the addition of kerosene and applied to a ball mill 18 for grinding in order to provide an extremely fine particle size to liberate the trapped carbon and thus upgrade the fraction of this carbon for blending with the overflow with the first flotation position. Thus by the milling at ball mill 18 and by applying the output to additional flotation tanks 19 and 20, a first flotation of 75 percent pure carbon consisting of about 0.5 percent of the input, may be added to the froth output of the tanks 15a as a relatively pure carbon black material. The froth output from the tank 20 may go to impoundment for further treatment, or may be discarded. Therefore, by means of the flotation cells 15a and 15b, a tailing is provided which is relatively free of carbon, and a concentrated commercial carbon product consisting of about 3 percent of the input is also obtained.

The underflow from the second tank of flotation cells 15b is fed to a thickener or scalper 25 in which the cenospheres are floated off. After removal of the carbon by flotation, the cenospheres are the lightest component of the fly ash, and are readily separable by allowing the fly ash slurry to settle a few minutes and scalping off the cenospheres that have floated to the surface. These may consist of about 0.3 percent of the input and are subjected to filtration, drying and storage. The yield of cenospheres can be increased by a brief agitation of the slurry followed by a second settling. Cenospheres continue to rise to the surface during several stirring-settling-scalping cycles. The cenospheres are, themselves, commercially valuable as acoustical insulation and as a lightweight ballast material. Microwave drying may be used to dry the cenospheres.

It is important to remove the cenospheres from the product, particularly where an enhanced pozzolan is produced, as these hollow spheres are weak and crush rather easily, and degrade the strength of the concrete product.

At this point, the underflow from the scalper 25 is fed partially to a ball mill 26. The ball mill further reduces the particle size and is used to control consistency so that the combined output from the thickener 25 is about 50 percent solids. This output is applied to a further set of series connected conditioners 28 and 28a. Also, at the conditioner 28, the underflow from the second flotation tank 20 is reapplied as an input to the main stream flow. At this point, a suitable dispersing agent may optionally be added, particularly if the end product is to be spray dried. However, the dispersing agent may be omitted.

The output of the conditioner 28a is applied to a wet magnetic separator, otherwise known as ferro filter 30, as shown at the top of FIG. 1B. Any number of suitable wet magnetic filter devices may be used, but it has been found that relatively low intensity wet magnetic separation may be used. A suitable magnetic separator is described in U.S. Pat. No. 2,074,085, issued Mar. 16, 1937 to Frantz.

The magnetic separator 30 is adjusted so that the first pass removes about 13 percent of the input thereto for approximately 12 percent of the total fly ash input. This first separation removes about 12 percent of the iron rich material and may run between 50 and 80 percent $Fe_2O_3$. Thus, the output of the ferro filter 30 represents a high concentrated iron product which may be pelletized or may be fed to a plasma arc furnace for the production of pit iron. It may also be used in heavy media separation.

Preferably, the non-magnetic output of the first ferro filter is applied to a second ferro filter 32 where a second magnetic fraction of approximately 19 percent of the total input is removed. The second filter 32 may be eliminated depending upon the necessity to have a relatively iron free ultimate product. This is shown by the broken lines 33 in FIG. 1B where 83 percent total of the output is applied directly to a hydroclassifier 35 and ball mill 36, and such products may be then used as an industrial filler.

However, to provide an enhanced pozzolan we prefer to employ the second ferro filter 32 which removes an additional 20 percent of a lower grade magnetic iron product, and the non-magnetic output of the filter 32 is then applied to the hydroclassifier 35 and ball mill 36. At this point, the enhanced pozzolan product is ground down further in fineness and minimizes the need for a dispersing agent. A dispersing agent may be added at this point in the form of 0.018–0.025 percent of calcium lignin sulfate or others, as commonly known in the cement and concrete mix industry as water reducing agents.

The output from the hydroclassifier 35 is fed into a thickener 40 where substantial quantities of water are removed so that the output is about 40–50 percent solids. At this point, lime at the rate of about 5 pounds per ton of solids may be added and blended in conditioners 42 and 43, the output of which is again filtered and dried, and provides the enhanced pozzolan 50 of the present invention. The pozzolan 50 is essentially free of carbon in that it has less than 1 percent carbon by weight and which is substantially free of magnetic iron in that it preferably contains no more than 6 percent $Fe_2O_3$ by weight and may vary from source to source. However, the output of the thickener 40 may be used directly without the addition of lime as an enhanced pozzolan or as an inert mineral filler. In either case, the dried output may be fed to storage silos and is a very fine product similar to kaolin clay or cement.

As noted above, only a small amount of lime, in the range of 0.0025 percent of input or about 0.004 percent of the treated product, is sufficient to treat the surface of the particles and enhance the pozzolanic activity. The resulting product is exceedingly fine, and is finer by far than the original input fly ash product, although the final product is essentially a fly ash product or by-product. Preferably, only the fly ash fraction finer than 50 mesh is treated and used by this process to eliminate the coarser fraction which is known to contain excessive carbon and iron. Then essentially all of the carbon and a major portion of the iron is removed and the resulting product is further reduced by grinding. The resulting processed fly ash product has a fineness so that at least 90 percent passes a 325 mesh screen by wet analysis, and preferably 100 percent will pass such a screen.

An analysis of one specific industrial filler or enhanced pozzolan prepared according to the invention, before adding lime, is as follows:

| | |
|---|---|
| Silica (SiO$_2$) | 55.32% |
| Alumina (Al$_2$O$_3$) | 30.87% |
| Ferric Oxide (Fe$_2$O$_3$) | 5.12% |
| Sulfur trioxide (SO$_3$) | 0.29% |
| Magnesium oxie (MgO) | 1.00% |
| Calcium oxide (CaO) | 2.10% |
| Titanium dioxide (TiO$_2$) | 2.00% |
| Moisture | 1.03% |
| Loss on ignition (carbon) | 0.27% |
| Per cent retained on 325 mesh sieve | 0.45% |
| Specific gravity | 2.47% |

CUBE TESTS

A number of cube tests were performed to determine first of all the effect of the pozzolanity of the fly ash by wet processing. Then, additional cube tests were run to determine the effect of removal of carbon and iron, to determine the effect of fineness of grinding and to determine the effect of adding lime. All of the cube tests were performed in accordance with the American Society for Testing Materials (ASTM) procedure set forth in ASTM C109. In accordance with this procedure, cementitious mixtures are made into cubes two inches square which are then cured and subjected to controlled crushing to determine strength. The amount of water added in each test was sufficient to provide the desired flow characteristic which is preferably 110 percent plus or minus 5 percent in accordance with ASTM procedures. The only deviation from the procedures set forth in ASTM C109, is that an accelerated cure rate was used. The ASTM procedure stipulates that the cube specimens be sealed and cured at 100° F. plus or minus 3° F. for 28 days. Based on laboratory work and based on the suggestions of the United States Army Corp of Engineers, an accelerated cure rate was substituted consisting of curing the cubes at 149° F. plus or minus 3° F. for the first 7 days of the cure, and thereafter maintaining the ASTM procedure.

CONTROL MIXES (a) Fifteen control mixes of Portland cement and sand were made in which from 132 to 137 grams of water were used obtaining a flow of 107 to 110 percent. In each of the fifteen control mixes, 250 grams of cement were used and 687.5 grams of sand were used. The 7 day strength in pounds per square inch of the cubes was 5,435 (average) and the 28 day strength was 6,764 psi (average).

(b) A second set of control tests were run to determine the compressive strength using natural unprocessed or raw fly ash. In the fly ash control tests and in all fly ash cube tests set forth below, Bowen fly ash was used in the following proportions: 65.2 grams of fly ash, 162.5 grams of cement and 687.5 grams of sand. Four tests were run and the amount of water added varied from a minimum of 130 milliliters to a maximum of 144 milliliters to provide the requisite flow characteristics, and the average 7 day strength was 4,880 psi and the average 28 day strength was 5,385 psi. Thus, in this and in the following tests, the amount of fly ash or processed fly ash substituted for cement consisted of approximately 28 percent of the pozzolanic material employed. In the fly ash control tests the compressive strengths of 4880 psi and 5,385 psi are typical of results which are obtained when 28 percent of the pozzolanic material employed in a cement mix is raw electrostatic fly ash.

WET PROCESSING TESTS (a) In order to determine whether there would be a deleterious effect by reason of a continued term of wet processing, Bowen fly ash was made in a 22% slurry consisting of 14 pounds of fly ash and 49 pounds of water, and was strongly agitated in a conditioner for 23 hours. It was then filtered and dried and cubes were made in accordance with the ratios identified above. The 7 day compressive strength was 4,913 psi and the 28 day strength was 5,409 psi. The results of this test indicated no adverse affect on pozzolanity by reason of 23 hours of wet processing.

(b) The above experiment was repeated, but after drying, the product was mixed in an attrition mill for 10 minutes at which time the particle size was somewhat reduced, although specific measurements of the particle size were not made. Again, mixes were made as identified above, and the 7 day strength of the cubes was 5,158 psi while the 28 day strength was 6,025 psi. The increase over the preceding test is believed to be due to the finer particle size due to the dry mixing in the attrition mill.

(c) In a further test to determine the effect of 48 hours of wetting of Bowen fly ash with minimum attrition, a dilute 9 percent slurry of fly ash consisting of approximately 5 pounds of fly ash in approximately 50 pounds of tap water was allowed to stand for 48 hours. It was then filtered, dried and subjected to a cube mix in the proportions identified above. The 7 day strength was 4,632 psi and the 28 day strength was 5,441 psi. This test indicated a slight decrease in pozzolanity by reason of the 48 hours of wetting, but the decrease was acceptable and not severe.

(d) In a further experiment the preceding was duplicated except the slurry was approximately 34 percent solids, made by mixing 25 pounds of fly ash with approximately 48 pounds of water and then allowed to stand for 48 hours, filtered and then dried. When cubes were made in accordance with the formula set out in control mix (b), the 7 day strength was 4,745 psi and the 28 day strength was 5,364 psi.

In summary, it was determined that up to 48 hours of wet processing did not adversely affect the pozzolanity of the fly ash.

SIZE FRACTION TESTS (a) A test was run to determine the pozzolanity of different size fractions of Bowen fly ash. In one portion of this test, only the ash which passed a 200 mesh but which would not pass a 325 mesh screen by dry sieving was used, and again blended in the proportions noted above. The 7 day strength was only 3,468 psi and the 28 day strength was only 3,886 psi. This indicates that the fraction coarser than 325 mesh is low in pozzolanic reaction. Further analysis indicated that a relatively large portion of this material exhibited magnetic tendencies and therefore contained an excessive amount of iron oxide.

(b) A second fraction of fly ash was used, all of which passed the 325 mesh screen by dry sieving. When this fly ash was then mixed in the above proportions, the 7 day strength was 5,291 psi and the 28 day strength was 5,889 psi. This indicates that there is a substantial improvement in pozzolanity using essentially only material smaller than 325 mesh.

CARBON REMOVAL TESTS

A series of experiments were conducted to determine the affect on pozzolanity of the removal of carbon.

(a) Carbon was removed from Bowen fly ash by froth flotation in which a slurry of fly ash of approximately 25 percent solids was conditioned with kerosene and then frothed with pine oil, the kerosene being added at a rate of 2 pounds per ton of fly ash. A carbon product was removed which was approximately 38 percent carbon and the remaining fly ash was then charged in a ball mill, the ball mill having 81 pounds of 1 inch diameter steel balls and 103 pounds of $\frac{3}{4}$ inch diameter steel balls. It was noted in the ball miling that some carbon film floated, indicating that the original carbon removal was incomplete. The product was then wet ground for about $2\frac{1}{2}$ hours, but this was not considered to be an optimum grind. The seven day cube tests, made in accordance with the above ratios, was 5,152 psi and the 28 day test was 5,787 psi.

(b) In a second experiment, the relatively carbon free fly ash of this experiment was dry ground in an attrition mill for 1 hour and this yielded a 7 day strength of 4,874 psi and a 28 day strength of 5,525 psi.

(c) In a third experiment, the same relatively carbon free material was dry ground for $4\frac{1}{2}$ hours in a Sweco attrition mill. The ground product was noticeably fine grained with much crushing evident. The 28 day strength of this $4\frac{1}{2}$ hours dry ground product was 5,079 psi and the 28 day strength was 6,317 psi. This indicates that removal of carbon and grinding together produce substantially increased pozzolanic activity.

CENOSPHERES REMOVAL TEST (a) In a further experiment, a hydroclassifier was used to scalp off a very fine fraction of fly ash and to remove the cenospheres. 70 pounds of Bowen fly ash was mixed in a conditioner and circulated through a hydroclassifier where a fraction consisting of cenospheres and a very fine fraction of fly ash was removed as an overflow from the hydroclassifier. The cenospheres were then removed by filtration, leaving the fine fraction, and this fine fraction yielded a 7 day strength of 5,424 psi and a 28 day strength of 6,591 psi.

(b) In the same test sequence, the carbon was then removed from the underflow of the hydroclassifier by flotation by adding 38 grams of kerosene, conditioning, then adding 8 drops of DOWFROTH 250 and scalping off the froth. The remainder was a relatively coarser fraction which was essentially free of carbon and cenospheres, but had not undergone any magnetic separation or milling to reduce the size. It yielded a 7 day strength of 4,272 psi and a 28 day strength of 5,075 psi. The lower ratings are considered contributable to the fact that the product was coarser than the fine fraction identified above. The removal of the cenospheres alone is not considered to be significant since the cenospheres occupy less than 1 percent of the fly ash and the removal of this small percentage does not, of itself, substantially enhance the pozzolanity of a fly ash derived product.

CARBON AND MAGNETIC SEPARATION (a) The carbon free fraction from the above experiment was then subjected to magnetic separation in a ferrofilter. The magnetic material which was removed in the first pass of the filter, although some of this material was inadvertently lost, was used in a test and produced a 7 day strength of 3,879 psi and a 28 day strength of 3,960 psi. This indicates that the magnetic fraction is relatively low in pozzolanity. The material was passed through the ferrofilter a second time and a second magnetic fraction was removed and this produced a 7 day strength of 3,702 psi and a 28 day strength of 4,308 psi. These figures for the magnetic fraction are comparable with the material removed from the first pass.

(b) The non-magnetic carbon free fraction was then tested and yielded a 7 day strength of 5,105 psi. 28 day strengths were not obtained because a second set of cubes were not made at that time for the 28 day test. However, the 7 day strengths indicate a substantial improvement by removal of carbon and magnetic iron even though the basic fly ash material was not otherwise reduced or ground in any way.

ENHANCEMENT EXPERIMENTS (a) To determine the effect of adding the very small amount of calcium hydroxide ($Ca(OH)_2$), 5 pounds per ton input of lime is added and gradually ground for 30 minutes with the conditioned fiy ash from Carbon Removal Test (c). The 7 day strength was 5,226 and the 28 day strength was 6,177 psi. This shows that the addition of even a very small amount of lime to an already improved pozzolan, one which was at least partially carbon free and which had been wet ground resulted in a still further improvement in pozzolanity.

(b) In an experiment intended to determine the optimum pozzolanity, the fly ash from the second pass of the magnetic filter from Carbon and Magnetic Separation Test (a), which was now essentially non-magnetic, was dry ground in a Sweco mill for 1 hour and then was wet conditioned for an additional $\frac{1}{2}$ hour in a flotation cell with lime added at the rate of 5 pounds per ton of fly ash. It was then filtered and dried. Specifically, 2000 grams of the non-magnetic and carbon free fly ash was mixed with 8 liters of water and 5 grams of $Ca(OH)_2$. The 7 day strength was 5,794 psi and the 28 day strength was 6,278 psi.

(c) In a further experiment, 35 pounds of crude fly ash was mixed with 35 pounds of water and 15.9 grams of kerosene in a conditioner for $\frac{1}{2}$ hour. It was then diluted with water in a 1:1 ratio, that is 4 liters of slurry to 4 liters of water, and was conditioned for 5 minutes in a flotation cell with air. The air was turned off and 22 drops of DOWFROTH 250 added, and air was turned on and the carbon froth was removed. The tailings were allowed to stand and the cenospheres were scalped off. This procedure was repeated three times until a total of about 106 pounds of carbon free tailings were stockpiled. A portion of the carbon free tailings were subjected to two passes in a ferromagnetic filter. In the first pass a product was removed which was approximately 30 percent ferric oxide, and in the second pass a product was removed which was approximately 60 percent ferric oxide, leaving an essentially non-magnetic fraction which analyzed slightly less than 5 percent ferric oxide expressed as $Fe_2O_3$. This essentially non-magnetic and carbon free product was then loaded into a hydroclassifier and circulated from the hydroclassifier into the ball mill and back to the hydroclassifier. It was wet ground in this manner for approximately 7½ hours to reduce the size and to fracture many of the spheres, thus increasing surface area. During the last hour of processing lime was added at the rate of 5 pounds of lime per ton of fly ash. The slurry was then filtered, dried and passed in the dry state through a 100 mesh sieve. Subsequent tests showed that approximately 100 percent would pass a 325 mesh screen by wet analysis. The conditioned product contained approximately 55.5 percent silicon dioxide, 28.1 percent aluminum oxide and approximately 5 percent iron oxide. It yielded a 7 day strength of 5,397 psi and a 28 day strength of 7,158 psi. The 28 day strength thus exceeded a 28 day strength of the control in which no fly ash was used at all. It substantially exceeded the control strengths in which raw or unprocessed fly ash was used.

By the process of this invention, raw fly ash is modified and made to yield a product with enhanced pozzolanity. Due to its greater pozzolanity, it can be used as a substitute for 40 percent of the Portland cement in structural concrete and give comparable compressive strengths which are obtained when using Portland cement alone. The carbon free and low iron fractions of the fly ash is a light colored and finely particulate silicate glass. Because of its inertness and fine particle size it is suitable as a mineral filler and extender in many commercial applications.

CYLINDER TESTS

In order to substantiate the results obtained by the laboratory cube tests described above, a number of cylinder tests were performed in which cylinders were made of concrete mixes in accordance with ASTM 192-69. These cylinders were subsequently tested according to the requirements of ASTM C-39-72, and the results are itemized below:

| Batch | Weight /Lbs. | Strength PSI (Average of Two Cylinders) | | | | |
|---|---|---|---|---|---|---|
| | | 3 Day | 7 Day | 28 Day | 56 Day | 90 Day |
| Mix No. 1 | | | | | | |
| Cement | 350 | 780 | 1225 | 1770 | 1915 | 1955 |
| Fly Ash | -0- | | | | | |
| Stone | 1948 | | | | | |
| Water | 324 | | | | | |
| Sand | 1288 | | | | | |
| Mix No. 2 | | | | | | |
| Cement | 350 | 1370 | 1800 | 2720 | 3210 | 3470 |
| Fly Ash | 70 | | | | | |
| Stone | 1900 | | | | | |
| Water | 324 | | | | | |
| Sand | 1257 | | | | | |
| Mix No. 3 | | | | | | |
| Cement | 350 | 1585 | 2060 | 3080 | 3575 | 4380 |
| Fly Ash | 100 | | | | | |
| Stone | 1920 | | | | | |
| Water | 300 | | | | | |
| Sand | 1268 | | | | | |
| Mix No. 4 | | | | | | |
| Cement | 350 | 1620 | 2050 | 3240 | 4060 | 4835 |
| Fly Ash | 130 | | | | | |
| Stone | 1900 | | | | | |
| Water | 300 | | | | | |
| Sand | 1253 | | | | | |
| Mix No. 5 | | | | | | |
| Cement | 350 | 1610 | 2310 | 3430 | 4365 | 4875 |
| Fly Ash | 160 | | | | | |
| Stone | 1879 | | | | | |
| Water | 300 | | | | | |
| Sand | 1242 | | | | | |
| Mix No. 6 | | | | | | |
| Cement | 350 | 2055 | 3100 | 4900 | 6055 | 6760 |
| E.P. | 160 | | | | | |
| Stone | 1927 | | | | | |
| Water | 275 | | | | | |
| Sand | 1273 | | | | | |
| Water Reducing Agent | 15.3 oz. | | | | | |
| Mix No. 7 | | | | | | |
| Cement | 350 | 1165 | 1900 | 3300 | 3825 | 4375 |
| E.P. | 70 | | | | | |
| Stone | 1945 | | | | | |
| Water | 300 | | | | | |
| Sand | 1285 | | | | | |
| Mix No. 8 | | | | | | |
| Cement | 350 | 1165 | 1925 | 3325 | 4400 | 4900 |
| E.P. | 100 | | | | | |
| Stone | 1925 | | | | | |
| Water | 300 | | | | | |
| Sand | 1272 | | | | | |
| Mix No. 9 | | | | | | |
| Cement | 350 | 1270 | 2155 | 3820 | 4870 | 5350 |
| E.P. | 130 | | | | | |
| Stone | 1907 | | | | | |
| Water | 300 | | | | | |
| Sand | 1260 | | | | | |
| Mix No. 10 | | | | | | |
| Cement | 350 | 1340 | 2230 | 4000 | 5385 | 6025 |
| E.P. | 160 | | | | | |
| Stone | 1886 | | | | | |
| Water | 300 | | | | | |
| Sand | 1247 | | | | | |
| Mix No. 11 | | | | | | |
| Cement | 517 | 2160 | 3120 | 4600 | 5150 | 5410 |
| E.P. | -0- | | | | | |
| Stone | 1905 | | | | | |
| Water | 300 | | | | | |
| Sand | 1259 | | | | | |

The "stone" consisted of a crushed granite material conforming to size No. 57 of ASTM C 33-74-A as a coarse aggregate. The "sand" was a fine aggregate as defined in ASTM C-33-74-A. The sand was adjusted in each mix to a ratio of 0.398 to the total aggregate. In Mixes Nos. 6 through 10, the term "E.P." refers to the pozzolan material made according to this invention, which material was further enhanced by the addition of 5 pounds of lime per ton input of fly ash into the wet processing process, in the manner described above under the heading "Enhancement Experiments."

Mix No. 11 may be considered as the control, in that 5½ bags of cement were used, resulting in a weight of 517 pounds, and consists of the amount of cement which is normally added for the amount of aggregate employed throughout the cylinder tests in making a cubic yard of concrete. In all of the other tests, only 350 pounds of cement were used, and the water was adjusted throughout to obtain the desired slump of between 4 inches and 4½ inches.

The results of the cylinder tests show that the use of the enhanced pozzolan of the present invention provides results which are substantially superior to using either cement alone (Mix No. 11) or the same weight of cement and fly ash (Mix No. 5). In Mix No. 5, approximately 31 percent of the total pozzolan was fly ash and in Mix No. 10 the same amount of enhanced pozzolan was substituted for the fly ash with substantially improved results after 28 days.

In Mix No. 6, about 15 ounces of a hydroxylated polymer type of water reducing agent sold under the designation "Pozzolith 300 N" by Master Builders, Division of Martin-Marietta Corp., 2490 Lee Boulevard, Cleveland, Ohio, was added, and still further improved results were obtained. The water reducing agent conformed to the requirements of a type "A" admixture as defined in ASTM C-494-71. The addition of a water reducing agent to Mix No. 6 provided a further and substantial improvement in each of the strength tests, and provided 28, 56 and 90-day strengths which substantially exceeded those of the control Mix No. 11, in which only cement was used.

Such water reducing agents conforming to ASTM C-470-74 are essentially dispersing agents and appear to assist materially in providing the optimum dispersion of the enhanced pozzolan of this invention throughout the mix. This is believed to be due to the fact that the enhanced pozzolan is substantially finer than cement, and the lime in the pozzolan as well in the cement is cationic, and is therefore a natural floccing agent. The addition of a small amount of a dispersing agent in the form of a water reducing agent provides an additional increase in strengths when the enhanced pozzolan of the present invention is used in place of either fly ash or the equivalent amount of cement.

An important advantage of the present invention resides in the fact that a powdered type water reducing agent, such as a lignin grinding aid (sodium or calcium lignosulphate), can be added in the dry state directly to the enhanced pozzolan product at the rate of approximately 0.018 percent of the total weight, thereby eliminating any need for adding a water reducing agent to the concrete mix itself. This can result in a further net overall savings in cost to the concrete mix company.

Mixes No. 1 through 5, in which only fly ash was used with 350 pounds of cement, provided strengths less than the control Mix No. 11 because there was insufficient pozzolanic material in these mixes. However, the effectiveness of the present enhanced pozzolan over using ordinary fly ash can be seen by comparing the results of Mix No. 7 versus Mix No. 2, Mix No. 8 versus Mix No. 3, and Mix No. 9 versus Mix No. 4. Although a water reducing agent was not added to Mixes 7 through 9, it is believed that the addition thereof would have provided a still further strength increase, as it did when it was added to Mix No. 6 as compared to Mix No. 10.

Based on the above experiments, it can be seen that a superior concrete product can be made by the use of the enhanced pozzolan of this invention. It can substitute and replace up to 40 percent of the Portland cement which would otherwise be required.

While the processes and products herein described constitute preferred embodiments of the invention, it is to be understood that the invention is not limited to these precise processes and products, and that changes may be made therein without departing from the scope of the invention.

What is claimed is:

1. The process for the manufacturing of an enhanced pozzolanic material from fly ash comprising the steps of:
    (1) mixing dry fly ash with water to form a slurry;
    (2) mixing a frothing agent with the slurry and agitating to form a carbon-rich froth and removing said froth therefrom to leave an essentially carbon free-fraction having less than 1 percent carbon by weight;
    (3) removing the cenospheres from said carbon-free fraction;
    (4) subjecting said carbon-free fraction to wet magnetic separation to remove the iron-rich particles therefrom providing a subfraction which is substantially free of magnetic iron;
    (5) reducing said subfraction in size by wet grinding to fracture the larger elements and increase the surface area thereof; and
    (6) drying the ground product to provide an enhanced pozzolanic material which is essentially free of carbon and magnetic iron oxide and in which the particle size is finer than said fly ash.

2. The process of claim 1 including the additional step of adding approximately 5 pounds of lime per ton of the ground product and conditioning to coat the individual particles with lime.

3. The process of claim 2 in which said lime is added prior to the drying step.

4. The process of claim 1 comprising the additional step of adding a dispersant to the product.

5. The process for the modification of raw fly ash comprising the steps of:
    (1) mixing dry electrostatic fly ash with water to form a slurry;
    (2) conditioning and adding a frothing agent to said slurry to form a carbon-rich forth;
    (3) removing said froth therefrom to leave an essentially carbon-free fraction;
    (4) subjecting said carbon-free fraction to wet magnetic separation to remove a major portion of the magnetic particles;
    (5) reducing said carbon-free fraction by wet grinding to fracture the larger elements and increase the surface area thereof; and
    (6) drying the ground product to provide a fine material which is essentially free of carbon and magnetic iron oxide and in which the particle size is finer than said fly ash.

6. The process of claim 5 including the additional step of adding approximately 5 pounds of lime per ton of the ground product and conditioning to coat the individual particles with lime to provide an enhanced pozzolan.

7. The process for the manufacture of an inert mineral filler or the like from raw fly ash comprising the steps of:
    (1) mixing dry fly ash with water to form a slurry;
    (2) conditioning said slurry with kerosene and mixing a frothing agent therewith to form a carbon-rich froth and removing said froth therefrom to leave an essentially carbon-free fraction;
    (3) subjecting said carbon-free fraction to wet magnetic separation to remove the iron-rich particles therefrom providing a subfraction containing no more than 6 percent magnetic iron;
    (4) reducing said subfraction in size by wet grinding to fracture the larger elements and increase the surface area thereof; and
    (5) drying the ground product to provide a finely reduced mineral filler which is essentially free of carbon and iron oxide.

8. The process for the recovery of a pozzolan, an inert filler, or the like, from raw fly ash comprising the steps of:
(1) mixing dry electrostatic fly ash with water to form a slurry of about 65 percent fly ash and 35 percent water;
(2) adding kerosene at the rate of approximately 2 pounds per ton of fly ash and conditioning for at least ½ hour;
(3) adding a frothing agent prior to the conclusion of conditioning to form a carbon-rich froth;
(4) removing said froth by flotation to leave an essentially carbon-free residue;
(5) removing the cenospheres from said residue by flotation;
(6) passing the remaining product through a wet magnetic separator and removing an iron-rich fraction therefrom which comprises approximately 50–80 percent ferric oxide and leaving a remainder which has approximately 6 percent magnetic iron content or less;
(7) wet grinding said remainder in a ball mill to reduce particle size so that approximately all thereof will pass a 325 mesh screen; and
(8) drying the ground product.

9. The process useful in the manufacture of an enhanced pozzolanic material from dry electrostatic fly ash comprising the steps of:

1. mixing the dry fly ash with water to form a flowable slurry;
2. conditioning said slurry for at least ½ hour in the presence of a flotation agent to separate the carbon-rich particles from said slurry and to form a carbon-free rich froth;
3. removing said froth from said slurry to leave a fly ash product which has less than 1% carbon by weight;
4. subjecting said product to wet magnetic separation to remove the iron-rich particles therefrom; and thereafter
5. reducing said product by wet grinding to fracture the larger particles and to decrease the particle size so that approximately 100% thereof passes a 325 mesh screen by wet analysis.

10. An enhanced pozzolan for use as a replacement for Portland cement in cementatious mixtures comprising water conditioned fly ash having less than 1 percent carbon, less than 6 percent magnetic iron, and a size so that about 100 percent thereof passes a 325 mesh screen by wet analysis.

11. A siliceous industrial filler consisting of fly ash particles having no more than 1 percent carbon and no more than 6 percent magnetic iron oxide expressed as $Fe_2O_3$ by weight, and of a size so that 100 percent passes a 325 mesh screen by wet analysis.

* * * * *

UNITED STATES PATENT AND TRADEMARK OFFICE
CERTIFICATE OF CORRECTION

PATENT NO. : 4,121,945
DATED : October 24, 1978
INVENTOR(S) : Vernon J. Hurst and Robert William Styron It is certified that error appears in the above-identified patent and that said Letters Patent are hereby corrected as shown below:

Column 1, line 65, after "content" insert -- of --.

Column 2, line 58, "remainer" should be -- remainder --.

Column 5, line 48, "techniques" should be -- percentages --.

Column 9, in the table, "magnesium oxie" should be
-- magnesium oxide --.

Signed and Sealed this

Sixteenth Day of January 1979

[SEAL]

Attest:

RUTH C. MASON
Attesting Officer

DONALD W. BANNER
Commissioner of Patents and Trademarks